UNITED STATES PATENT OFFICE.

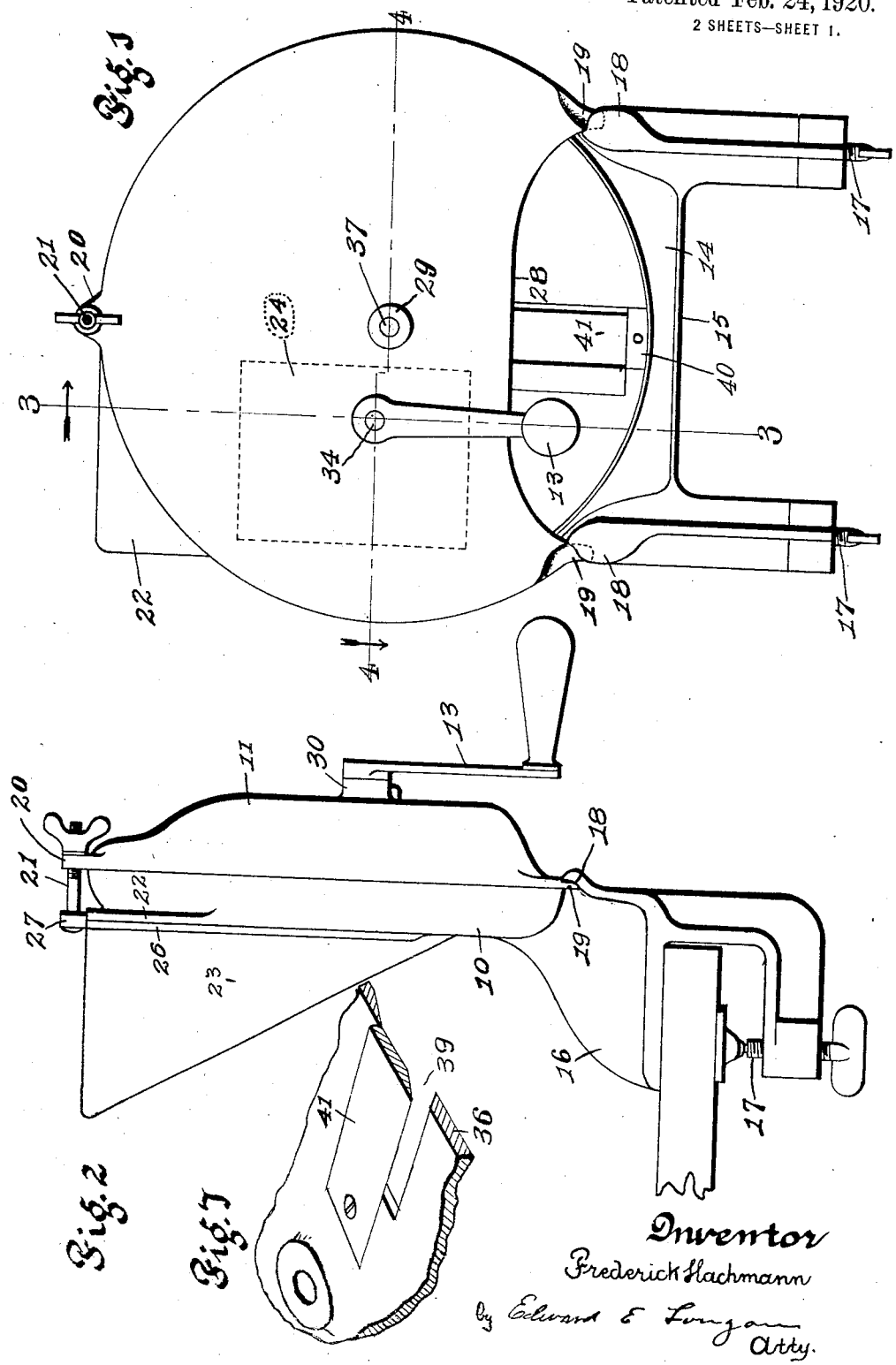

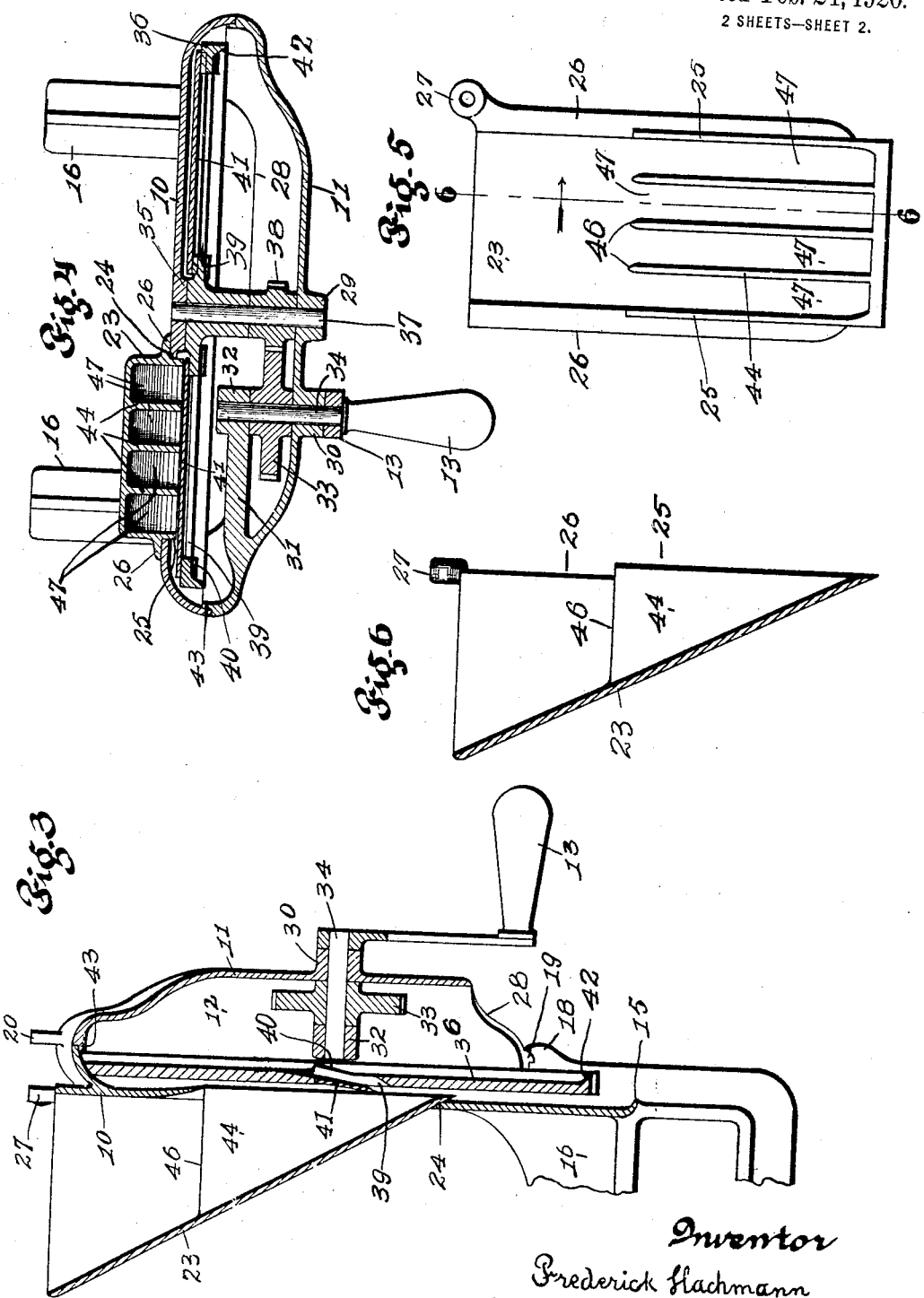

FREDERICK HACHMANN, OF ST. LOUIS, MISSOURI, ASSIGNOR TO OTTO REINERT, OF ST. LOUIS, MISSOURI.

VEGETABLE-CUTTER.

1,331,497.  Specification of Letters Patent.  Patented Feb. 24, 1920.

Application filed May 12, 1919. Serial No. 296,541.

*To all whom it may concern:*

Be it known that I, FREDERICK HACH-MANN, a citizen of the United States, and resident of the city of St. Louis and State of Missouri, have invented certain new and useful Improvements in Vegetable-Cutters, of which the following is a specification containing a full, clear, and exact description, reference being had to accompanying drawings, forming a part hereof.

This invention relates to vegetable cutters and has for its primary object a vegetable cutter constructed entirely of metal which is easily and quickly taken apart and cleaned.
A further object is to construct a vegetable cutter with revolving knives and a variety of hoppers so that different vegetables may be sliced or cut with the same machine.

A still further object is to construct a vegetable cutter intended primarily for household use which is constructed entirely of metal so that the same is non-absorbent, in other words, will not absorb the juices of the vegetables being cut, which a device constructed of wood will do, and therefore the same is more sanitary and being non-absorbing will be odorless and which also can be readily sterilized after use, either by placing the same in a hot oven for heat sterilization or plunging the same into boiling water.

A further object is to provide a vegetable cutter with a number of interchangeable hoppers in which various kinds of vegetables or fruits may be placed for slicing.

In the drawings:

Figure 1 is a face view of my device assembled, looking at the same from the operating side.
Fig. 2 is a side elevation of the same showing the device secured to the edge of a table.

Fig. 3 is a cross-sectional view taken on the line 3—3 of Fig. 1, and viewing the same in the direction of the arrow.

Fig. 4 is a horizontal cross-sectional view taken on the line 4—4 of Fig. 1 and viewing the same in the direction of the arrow.

Fig. 5 is an inside view of one of the hoppers made use of.

Fig. 6 is a vertical sectional view of the same taken on the line 6—6 of Fig. 5, and viewing the same in the direction of the arrow.
Fig. 7 is a fragmental perspective view illustrating the portion of the cutter disk and the manner of securing the cutter blades thereto.

In the construction of my device, I provide a body which is composed of sections 10 and 11, these sections being preferably formed of cast metal and are dish shaped as to form a chamber 12 when the two parts are connected together, and within this chamber all of the operating mechanism is contained with the exception of the crank 13 is contained. These portions are practically circular in form, the portion 10, however, being provided with a downwardly extending portion 14 which is provided at its lower end with a projecting lip 15, this lip tending to direct the juices, which result from the cutting of vegetables or fruits, away from the edge of the table or board to which the device is secured.

Formed integral with the member 10 are the clamping arms 16, these clamping arms being provided with a thumb screw 17 so as to allow for various thicknesses of table tops or boards and are of the well known thumb screw type.

On the clamping arms 16 are formed pockets 18 in which tongues 19, formed integral with the member or portion 11, are inserted. On the upper part of the member 11 is provided a perforated ear 20 through which a bolt 21 passes.

Projecting from the member 10 in upward direction is a plate 22 against which a portion of the detachable hopper 23 rests. A portion of this hopper is inserted through an opening 24 formed in the member 10, see Figs. 1 and 3, and is provided with projecting flanges 25 which fit within the opening, and with flanges 26 which fit against the outer face of the member 10, see Fig. 4. This detachable hopper is provided with a perforated lug 27 through which the bolt 21 passes. By means of this bolt, the members 10 and 11, as well as the detachable hopper 23, are secured together, the tongues 19 and the pockets 18 acting as the securing means for the lower portion of the members 10 and 11.
The lower portion of the member 11 is cut away as indicated by the numeral 28, thus allowing the vegetables after being sliced to be discharged from the machine into a suitable receptacle. Formed on the member 11 are bosses 29 and 30 and on the interior of the member 11 is also formed the integral bracket 31 which is provided with a boss 32, this boss being directly opposite the boss 30.

Between the inner surface of the member 11 and the boss 32 is secured a gear 33 which is mounted on a shaft 34, this shaft extending through the bosses 32 and 30 and is secured to the crank 13 in any well known manner. It is to be understood, of course, that the gear 33 is also secured to the shaft 34 so that the gear and crank will revolve simultaneously and that there will be no danger of the shaft 34 from becoming loosened and slipping out of its bearings.

On the inner surface of the member 10 and opposite the boss 29 is formed a boss 35 against which a portion of the cutter disk 36 contacts. Through the boss 29 and the projection 35 is the shaft 37, on which is tightly secured a gear 38, this gear meshing with the gear 33 and on the shaft 37 is also secured a revolving disk 36, this disk being provided with slotted openings 39 and on each edge, that is, the edge nearest the center and the edge nearest the rim with the slanting or sloping projections 40 to which the cutter blades 41 are attached. This is done preferably by means of countersunk screws so as to leave no projection beyond the face of the cutter blade and still allow ready removal of the blades for sharpening purposes.

These cutter blades 41 or rather their cutting edge comes in close proximity to the projection 25 formed on the hopper 23, so that the cutter blade and this projecting edge will have a shearing effect and not a tearing tendency. That portion of the cutter disk 36 opposite that side on which the cutter blades are secured is provided with a tapered projecting flange 42, the object of this being to direct the cut-off portions outwardly from the disk and through the opening formed by the cut-away portion 28 of the member 11. The member 11 is also provided with an inwardly projecting flange 43 which centralizes it on the member 10 and will prevent any shifting of the two parts after they have been placed together.

In the hopper 23, as shown in the drawings, I have provided partitions 44 which partitions are rounded on their upper edges as illustrated by the numeral 46, this construction being shown in Figs. 3, 4, 5 and 6 and is designed for the purpose of slicing string beans. When it is desired to slice other vegetables such as cabbage, potatoes, beets, turnips, and the like, I replace this hopper with one in which the partitions 44 have been left out, the partitions 44, however, only extending upward far enough to enter the opening 24 formed in the member 10. My object in forming these partitions for string bean slicing is so that a hand full of string beans can be inserted in the hopper and find their way into the passages 47 formed between these partitions and the side walls of the hopper 23, it being understood, of course, that the string beans are gathered in the hand and placed with one of their ends pointed downward in the hopper.

When my device is used, it will be almost impossible for the operator to have his fingers come in contact with the knives as the upper end hopper projects sufficiently above the point of contact of the knives, and the vegetables or fruit to be cut are fed downward by gravity and also by the pull exerted by the knives.

It will be observed from the foregoing that a variety of vegetables such as beans, cabbage and potatoes may be sliced by the provision of the interchangeable hoppers, the hopper illustrated being designed especially for the slicing of string beans. If desired, the machine may be built on a larger scale and the cutter disk operated by power.

It will also be observed that my invention comprises but a few parts, these being primarily the members 10 and 11, which form the casing of the machine, and the detachable hopper 23. All of these are secured together by means of one bolt.

If it is desired, a solid disk may be employed provided with a grating surface which construction could be used for grating horse-radish, turnips, potatoes and the like. It will thus be seen that I have constructed a single unitary machine which is capable of slicing or grating important substances for household consumption.

The working parts of the machine with the exception of the gears, shafts and knives, are preferably coated with baked enamel, thereby making the same rust proof and thoroughly sanitary.

Having fully described my invention, what I claim is:

1. A vegetable cutter composed of two dish-shaped portions substantially circular in form, a disk having a series of cutter blades mounted thereon and interposed between sections and carried thereby, a mechanism carried by one of said sections whereby the disk and cutter blades are rotated simultaneously, a detachable hopper carried by the other portion for receiving vegetables to be cut, and a single bolt for securing the two dish-shaped portions and the hopper together.

2. A vegetable cutter composed of two dish shaped portions substantially circular in form, a disk revolubly mounted between the dish shaped portions, cutter blades secured to said disk, a gear carried by the disk, a second gear carried by one of the portions and meshing with the first mentioned gear, a handle for operating said second mentioned gear, and mounted outside of the portion carrying said gear, a hopper carried by the other portion for receiving the vegetables to be cut, and a single bolt for securing both portions and the hopper together.

3. A vegetable cutter comprising a housing composed of two dish-shaped portions substantially circular in form, a disk, a series of cutter blades mounted on the disk, said disk and cutter blades being interposed between the dish shaped portions forming the housing and carried thereby, a mechanism carried by one of said sections whereby the disk and cutter blades are rotated, a removable hopper carried by the other portion of the housing for receiving vegetables to be cut, and a bolt for securing both portions of the housing and hopper together simultaneously.

4. A vegetable cutter comprising a housing composed of two dish-shaped portions, a disk and a series of cutters carried thereby revolubly mounted between the two sections, a gear secured to the disk, a second gear carried by one of the portions and meshing with the first mentioned gear, a handle for placing the said second mentioned gear in rotation, said handle being mounted outside the portion carrying said second mentioned gear, a removable hopper carried by the other portion, said hopper adapted to receive vegetables for feeding the same to the knives carried by the disk, and means for securing the two portions of the housing and hopper together simultaneously.

5. A vegetable cutter comprising a casing formed of dish-shaped members, one of which is provided on its lower portion with tongues and a discharge opening and the upper portion with a perforated ear, the other member being provided on its lower portion with a recess adapted to receive the tongues carried by the first mentioned member and with an opening formed in its face, a rotating cutter disk mounted between said members, and a detachable hopper located in the opening formed in the last mentioned member, said detachable hopper provided with a perforated ear, and a fastening means adapted to be inserted through the ear formed on the detachable hopper and the first mentioned member for uniting the same together.

In testimony whereof, I have signed my name to this specification, in presence of two subscribing witnesses.

FREDERICK HACHMANN.

Witnesses:
 ELIZABETH CARTALL,
 WALTER C. STEIN.